US011869251B2

(12) United States Patent
Miyagawa

(10) Patent No.: US 11,869,251 B2
(45) Date of Patent: Jan. 9, 2024

(54) DRIVING SUPPORT METHOD AND DRIVING SUPPORT DEVICE

(71) Applicants: Nissan Motor Co., Ltd., Yokohama (JP); Renault S.A.S., Boulogne-Billancourt (FR)

(72) Inventor: Tadahisa Miyagawa, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 519 days.

(21) Appl. No.: 17/256,252

(22) PCT Filed: Jul. 2, 2018

(86) PCT No.: PCT/IB2018/000849
§ 371 (c)(1),
(2) Date: Dec. 28, 2020

(87) PCT Pub. No.: WO2020/058735
PCT Pub. Date: Mar. 26, 2020

(65) Prior Publication Data
US 2021/0224557 A1 Jul. 22, 2021

(51) Int. Cl.
G06V 20/56 (2022.01)
G01C 21/30 (2006.01)

(52) U.S. Cl.
CPC .......... G06V 20/588 (2022.01); G01C 21/30 (2013.01)

(58) Field of Classification Search
CPC .............................. G01C 21/30; G06V 20/588
See application file for complete search history.

(56) References Cited

U.S. PATENT DOCUMENTS

| 11,001,300 | B2* | 5/2021 | Kumano | B60R 1/00 |
| 2010/0104139 | A1* | 4/2010 | Kuehnle | G06V 20/588 |
| | | | | 382/106 |
| 2015/0227799 | A1* | 8/2015 | Kataoka | G06V 20/56 |
| | | | | 382/199 |

(Continued)

FOREIGN PATENT DOCUMENTS

| JP | 2017-181870 A | 10/2017 | |
| JP | 2017181870 A | * 10/2017 | ............. G01C 21/30 |
| WO | 2017056249 A1 | 4/2017 | |

OTHER PUBLICATIONS

Schroedl, S., Wagstaff, K., Rogers, S et al. Mining GPS Traces for Map Refinement. Data Min Knowl Disc 9, 59-87 (2004). (Year: 2004).*

*Primary Examiner* — Pinalben Patel
(74) *Attorney, Agent, or Firm* — Young Basile Hanlon & MacFarlane, P.C.

(57) ABSTRACT

A driving support method including: detecting a first boundary point group including boundary points forming a lane boundary line, using a sensor mounted on a vehicle; converting a coordinate system of the first boundary point group to the same coordinate system as a coordinate system of map data; and performing matching between a first point group constituted by boundary points not close to each other in either one of a second boundary point group including boundary points forming a lane boundary line in the map data and the first boundary point group and the other of the first boundary point group and the second boundary point group.

10 Claims, 8 Drawing Sheets

(56) References Cited

U.S. PATENT DOCUMENTS

| | | | |
|---|---|---|---|
| 2015/0269446 A1* | 9/2015 | Takemae | G06T 7/12 |
| | | | 382/199 |
| 2018/0273031 A1 | 9/2018 | Fujita et al. | |
| 2018/0373941 A1* | 12/2018 | Kwant | G08G 1/0145 |
| 2019/0025071 A1 | 1/2019 | Fukui | |
| 2019/0266418 A1* | 8/2019 | Xu | G06F 18/24143 |
| 2022/0309281 A1* | 9/2022 | Abbas | G06F 18/23 |

\* cited by examiner

DRIVING SUPPORT METHOD AND DRIVING SUPPORT DEVICE

TECHNICAL FIELD

The present invention relates to a driving support method and a driving support device.

BACKGROUND

In JP 2017-181870 A, a technology to determine inconsistency between observation information of the real world acquired by a sensor and a map serving as a reference of a peripheral environment is described.

SUMMARY

There are some cases where, in matching point group data acquired by a sensor with point group data in map data, existence of a plurality of pieces of point data representing points close to each other in the point group data causes a mismatch to occur. For example, when a plurality of pieces of point data representing points close to each other exist in the point group data in the map data, point data that are generally not allowed to be matched are sometimes matched with point data acquired by the sensor.

An object of the present invention is to reduce mismatches between a point group acquired by a sensor and a point group in map data.

According to one aspect of the present invention, there is provided a driving support method including: detecting a first boundary point group including boundary points forming a lane boundary line, using a sensor mounted on a vehicle; converting a coordinate system of the first boundary point group to the same coordinate system as a coordinate system of map data; and performing matching between a first point group constituted by boundary points not close to each other in either one of a second boundary point group including boundary points forming a lane boundary line in the map data and the first boundary point group and the other of the first boundary point group and the second boundary point group.

According to the aspect of the present invention, it is possible to reduce mismatches between a point group acquired by a sensor and a point group in map data.

The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION

An embodiment of the present invention will now be described with reference to the drawings.
(Driving Support Device)

A driving support device according to an embodiment of the present invention can be mounted on a vehicle (hereinafter, a vehicle on which a driving support device according to the embodiment of the present invention is mounted is referred to as a "host vehicle").

Figure 1:
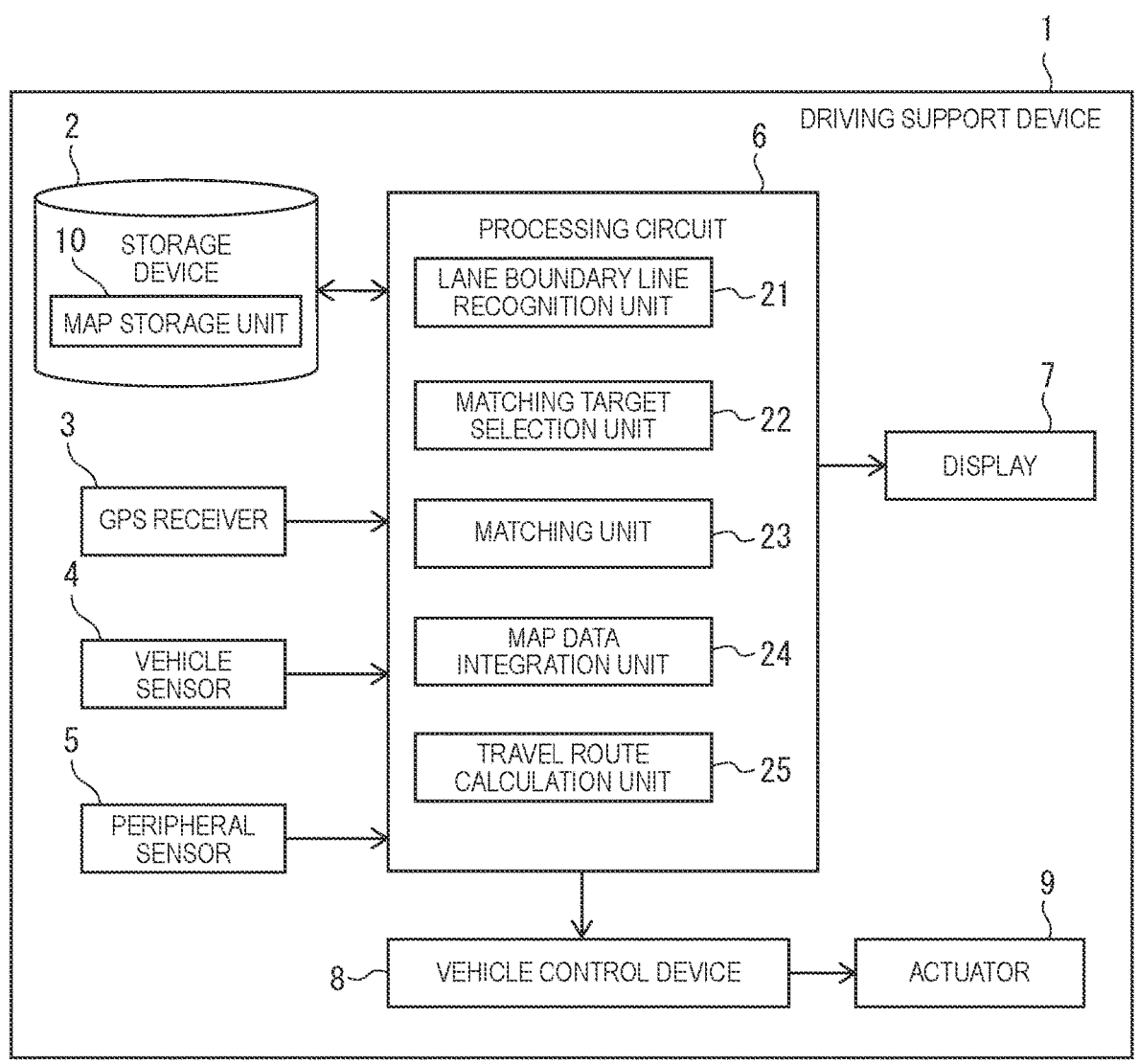
FIG. 1 is a diagram illustrative of a schematic configuration example of an example of a driving support device of an embodiment.

FIG. 1 is now referred to. A driving support device 1 according to the embodiment of the present invention includes a storage device 2, a global positioning system (GPS) receiver 3, vehicle sensors 4, peripheral sensors 5, a processing circuit 6, a display 7, a vehicle control device 8, and actuators 9.

The processing circuit 6, the storage device 2, the GPS receiver 3, the vehicle sensors 4, the peripheral sensors 5, the display 7, and the vehicle control device 8 can transmit and receive data and signals to and from one another in a wired manner, such as through a controller area network (CAN) bus, or in a wireless manner.

The storage device 2 may be, for example, a semiconductor storage device, a magnetic storage device, or an optical storage device. The storage device 2 may be built into the processing circuit 6. The storage device 2 includes a map storage unit 10 that stores map data.

With the map data stored in the map storage unit 10, point data acquired by the peripheral sensors 5 are integrated by the driving support device 1 according to the embodiment of the present invention. The map data stored in the map storage unit 10 may be, for example, high-definition map data (hereinafter, simply referred to as "high-definition map").

The high-definition map is suitable as a map for use in autonomous-driving. The high-definition map is map data of higher definition than map data for navigation (hereinafter, simply referred to as "navigation map") and includes information in a unit of lane, which is more detailed than information in a unit of road.

For example, the high-definition map includes, as information in a unit of lane, information of lane nodes that indicate reference points on a lane reference line (for example, a central line in a lane) and information of lane links that indicate forms of lane sections between lane nodes.

Information of each lane node includes an identification number and position coordinates of the lane node, the number of connected lane links, and identification numbers of connected lane links.

Information of each lane link includes an identification number of the lane link, the type of the lane, width of the lane, the types of lane boundary lines, the shape of the lane, and the shape of the lane reference line.

The high-definition map further includes information of ground objects, such as a traffic light, a stop line, a road sign, a building, a utility pole, a curb, and a crosswalk, that exist on a lane or in the vicinity of the lane. The information of ground objects may indicate the types and position coordinates of the ground objects, and identification numbers of lane nodes and identification numbers of lane links that correspond to the position coordinates of the ground objects.

Since the high-definition map includes node information and link information in a unit of lane, it is possible to specify a lane on which the host vehicle travels along a travel route.

The high-definition map has a coordinate system that can represent positions in the extending direction and width direction of each lane. For example, the high-definition map may have point group data of boundary points that form lane boundary lines.

The high-definition map has coordinates (for example, longitude, latitude, and altitude) that can represent positions in the three-dimensional space, and lanes and the above-described ground objects can be described as shapes in the three-dimensional space.

Note that map data with which point data acquired by the peripheral sensors 5 are integrated by the driving support device 1 do not necessarily have to be a high-definition map and only have to be map data that include point group data of boundary points forming lane boundary lines.

Note that it may be configured such that a database of map data is managed in a server separate from the driving support device 1, difference data of updated map data are acquired through, for example, a telematics service, and update of map data stored in the map storage unit 10 is performed.

It may also be configured to acquire map data corresponding to a position where the host vehicle is currently traveling, using a telematics service, such as vehicle-to-vehicle communication and road-to-vehicle communication.

Using the telematics service makes it unnecessary for the host vehicle to retain map data, the volume of which is generally large, and enables the capacity of a memory to be suppressed. In addition, since using the telematics service enables updated map data to be acquired, it is possible to accurately figure out an actual driving situation, such as changes in road structures and presence of a construction site. Further, since using the telematics service enables map data produced based on data collected from a plurality of vehicles other than the host vehicle to be used, it is possible to figure out accurate information.

The GPS receiver 3 receives radio waves from a plurality of navigation satellites, acquires a current position of the host vehicle, and outputs the acquired current position of the host vehicle to the processing circuit 6. Note that the driving support device 1 may include another global navigation satellite system (GNSS) other than the GPS receiver 3.

The vehicle sensors 4 are sensors that detect a current position and a driving state of the host vehicle. Although the vehicle sensors 4 may be, for example, a vehicle speed sensor, an accelerometer, and a gyro sensor, the types and number of the vehicle sensors 4 are not limited to the example.

The vehicle speed sensor detects a vehicle speed, based on the wheel speed of the host vehicle and may output the detected vehicle speed to the processing circuit 6.

The accelerometer detects acceleration in the longitudinal direction and acceleration in the vehicle width direction of the host vehicle and may output the detected acceleration to the processing circuit 6.

The gyro sensor detects an angular velocity of the host vehicle and may output the detected angular velocity to the processing circuit 6.

The peripheral sensors 5 are sensors that detect a peripheral environment (peripheral situation) around the host vehicle. Although the peripheral sensors 5 may be, for example, cameras, radars, communication devices, and the like, the types and number of the peripheral sensors 5 are not limited to the example.

The cameras used as peripheral sensors 5 may be, for example, CCD cameras. The cameras may be monocular cameras or stereo cameras.

The cameras capture images of the peripheral environment around the host vehicle, detect, from the captured images, relative positions between objects, such as vehicles, pedestrians, and bicycles, and the host vehicle, distances between the objects and the host vehicle, road structures, such as lane boundary lines (white lines) and curbs, on a road, and the like as data of the peripheral environment around the host vehicle, and outputs the detected data of the peripheral environment to the processing circuit 6.

The radars used as peripheral sensors 5 may be, for example, millimeter-wave radars, ultrasonic radars, or laser range finders (LRF).

The radars detect relative positions between objects and the host vehicle, distances between the objects and the host vehicle, relative velocities between the objects and the host vehicle, and the like as data of the peripheral environment around the host vehicle and output the detected data of the peripheral environment to the processing circuit 6.

The communication devices used as peripheral sensors 5, by performing vehicle-to-vehicle communication with other vehicles, road-to-vehicle communication with roadside units, communication with a traffic information center and the like, or the like, receives data of the peripheral environment around the host vehicle and may output the received data of the peripheral environment to the processing circuit 6.

In the description of the present invention, each of the GPS receiver 3, the vehicle sensors 4, and the peripheral sensors 5 can be used as sensors capable of detecting actual (real) road structures and the like in the periphery around the host vehicle.

The processing circuit 6 is a controller, such as an electronic control unit (ECU), that performs arithmetic/logic operation in processing required for driving support of the host vehicle.

For example, the processing circuit 6 may include, for example, a processor, a storage device, and an input/output interface. The processor may be a central processing unit (CPU) or the like that includes an arithmetic logic unit (ALU), a control circuit (control device), various types of registers, and the like or a microprocessor equivalent to the CPU.

The storage device that is built into or externally attached to the processing circuit 6 may be a semiconductor memory, a disk medium, or the like and may include a storage medium, that is registers, a cache memory, a ROM and a RAM used as a main storage device, or the like.

For example, the processor in the processing circuit 6, by executing programs stored in the storage device in advance, performs information processing by the driving support device 1, which will be described below.

For example, the processing circuit 6 may, by outputting guide information based on the map data stored in the map storage unit 10 from an information presentation device, such as the display 7 and a speaker, present the guide information to a passenger.

In addition, the processing circuit 6 may, for example, perform the driving support of the host vehicle. For example, the driving support may be full autonomous-driving in which the host vehicle automatically drives without involvement of a passenger (for example, the driver) or driving support that controls at least one of drive, braking, and steering.

That is, in the description of the present invention, the driving support includes not only a case of performing control of all of the drive, braking, and steering of the host vehicle without involvement of a passenger but also a case of performing control of at least one of the drive, braking, and steering of the host vehicle.

When the driving support is performed, the processing circuit 6 generates, based on the map data stored in the map storage unit 10, a travel route along which the host vehicle is made to travel. For example, the processing circuit 6 specifies the position of the host vehicle on the map data and generates a travel route in such a way that the travel route is drawn in the lane, based on the position of the host vehicle. The planned travel route may be generated in such a way as to pass the center in the lane.

The processing circuit 6 outputs the generated travel route to the vehicle control device 8.

The vehicle control device 8 is an electronic control unit that performs driving control of the host vehicle. The vehicle control device 8 includes a processor and peripheral components, such as a storage device. The processor may be, for example, a CPU or a microprocessor equivalent thereto.

The storage device may include any of a semiconductor storage device, a magnetic storage device, and an optical storage device. The storage device may include a memory, such as registers, a cache memory, a ROM and a RAM that are used as a main storage device, or the like.

Note that the vehicle control device 8 may be achieved by a functional logic circuit that is implemented in a general-purpose semiconductor integrated circuit. For example, the vehicle control device 8 may include a programmable logic device (PLD), such as a field-programmable gate array (FPGA), and the like.

The vehicle control device 8 calculates control amounts of the actuators 9 in such a way that the host vehicle travels along the travel route generated by the processing circuit 6. The vehicle control device 8 transmits the calculated control amounts to the actuators 9.

The actuators 9 control the travel of the host vehicle in accordance with control signals from the vehicle control device 8. The actuators 9 may be, for example, drive actuators, brake actuators, and steering actuators.

The drive actuators may be, for example, electronically controlled throttle valves and control, based on control signals from the vehicle control device 8, the accelerator opening degree of the host vehicle.

The brake actuators may be, for example, hydraulic circuits and control, based on control signals from the vehicle control device 8, the braking actions of brakes of the host vehicle.

The steering actuators control, based on control signals from the vehicle control device 8, the steering of the host vehicle.

Although, when generating a travel route, the processing circuit 6 refers to the map data stored in the map storage unit 10, position information of the peripheral environment with high precision can be acquired from the peripheral sensors 5. Therefore, it is preferable to use not only the map data but also data of the peripheral environment from the peripheral sensors 5 in combination.

Figure 2:
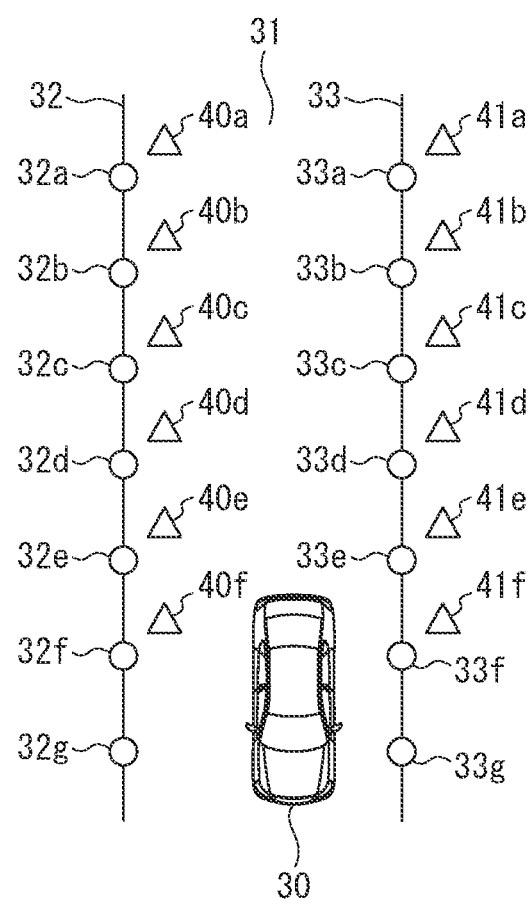
FIG. 2 is an explanatory diagram of boundary point groups forming lane boundary lines.

FIG. 2 is now referred to. In the map data, the position coordinates of boundary points 32*a* to 32*g* forming a lane boundary line 32 and the position coordinates of boundary points 33*a* to 33*g* forming a lane boundary line 33, the lane boundary lines 32 and 33 indicating lane boundary lines of a lane 31 on which the host vehicle 30 travels, are stored.

In addition, the position coordinates of boundary points 40*a* to 40*f* forming the lane boundary line 32 in the real world and the position coordinates of boundary points 41*a* to 41*f* forming the lane boundary line 33 in the real world are detected by the peripheral sensors 5.

Note that the boundary points 32*a* to 32*g*, 33*a* to 33*g*, 40*a* to 40*f*, and 41*a* to 41*f* may be road marking lines (for example, white lines) or lane markers that indicate lane boundaries or structures, such as gutters, curbs, guardrails, and poles.

Hereinafter, a point group made up of boundary points 40*a* to 40*f* and 41*a* to 41*f* forming the lane boundary lines in the real world that are detected by the peripheral sensors 5 is sometimes referred to as a "first boundary point group". On the other hand, a point group made up of boundary points 32*a* to 32*g* and 33*a* to 33*g* forming the lane boundary lines in the map data is sometimes referred to as a "second boundary point group".

In order to use the first boundary point group and the second boundary point group for generation of a travel route, the processing circuit 6 matches each of the boundary points in the first boundary point group with any of the boundary points in the second boundary point group.

In the description of the present invention, the term "matching" means determining a combination of each boundary point in the first boundary point group, which are obtained by detecting boundary points in the real world, and a boundary point in the second boundary point group (that is, a boundary point in the map data) that corresponds to the boundary point in the first boundary point group.

Figure 3:
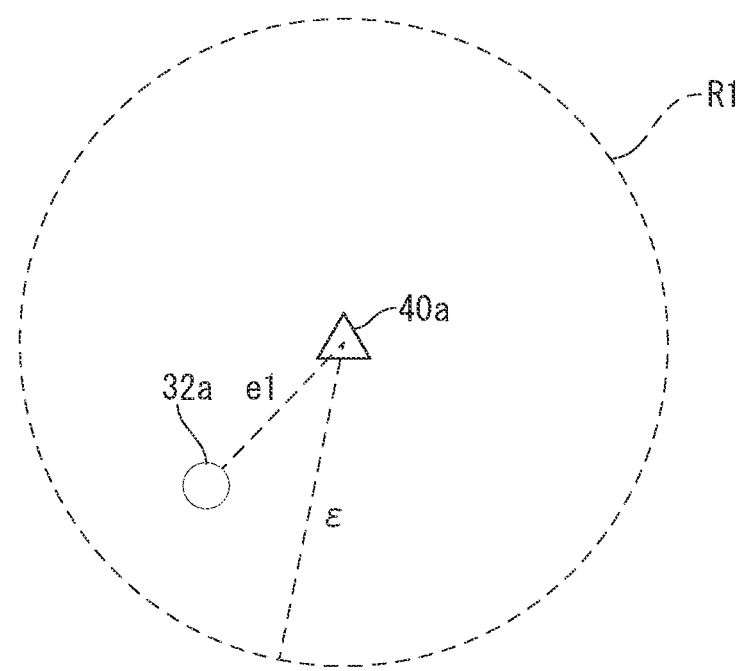
FIG. 3 is an explanatory diagram of an example of matching processing.

With reference to FIG. 3, an example of matching between the first boundary point group and the second boundary point group will be described.

First, the processing circuit 6 converts the coordinate system of the first boundary point group to the same coordinate system as that of the map data. For example, the processing circuit 6 converts, based on a current position of the host vehicle measured by the GPS receiver 3, the coordinate system of the first boundary point group, which is a local coordinate system with the origin set at the position of the host vehicle, to a map coordinate system on which the map data is based.

Next, the processing circuit 6 sets a search circle R1 with a radius c to the boundary point 40*a* in the first boundary point group and searches the inside of the search circle R1 for a boundary point in the second boundary point group.

The processing circuit 6 determines the boundary point 32*a*, which exists inside the search circle R1, among the boundary points in the second boundary point group as a boundary point in the second boundary point group that corresponds to the boundary point 40*a* in the first boundary point group. The processing circuit 6 determines a combination of the boundary point 40*a* and the boundary point 32*a*.

Further, the processing circuit 6 integrates the first boundary point group, the coordinate system of which has been converted to the same coordinate system as that of the map data, and the second boundary point group with each other.

In the description of the present invention, the term "to integrate" means processing of coupling data of the first boundary point group with data of the second boundary point group while boundary points in the first boundary point group and boundary points in the second boundary point group that are combined with each other by the matching are associated with each other.

For example, the term "to integrate" may include correcting the position coordinates of the boundary points in the second boundary point group in such a way that positional error between boundary points in the first boundary point group and boundary points in the second boundary point group that are combined with each other by the matching is minimized.

FIG. 3 illustrates a positional error "e1" between the boundary point 40a in the first boundary point group and the boundary point 32a in the second boundary point group, which are matched with each other.

A case is now assumed where the boundary points 40a to 40f in the first boundary point group and the boundary points 32a to 32f in the second boundary point group are matched with each other, respectively, and the boundary points 41a to 41f in the first boundary point group and the boundary points 33a to 33f in the second boundary point group are matched with each other, respectively.

Positional errors between the boundary points 40a to 40f in the first boundary point group and the boundary points 32a to 32f in the second boundary point group are denoted by e1 to e6, respectively, and positional errors between the boundary points 41a to 41f in the first boundary point group and the boundary points 33a to 33f in the second boundary point group are denoted by e7 to e12, respectively.

The processing circuit 6 calculates the sum E of the positional errors expressed by the formula below.

$$E = \sum_{i=1}^{12} ei$$

The processing circuit 6 moves the position coordinates of the boundary points 32a to 32f and the boundary points 33a to 33f in the same direction by the same distance and calculates a movement amount M that minimizes the sum E of the positional errors and thereby aligns the positions of the boundary points 40a to 40f in the first boundary point group and the positions of the boundary points 32a to 32f in the second boundary point group with each other.

Figure 4A:
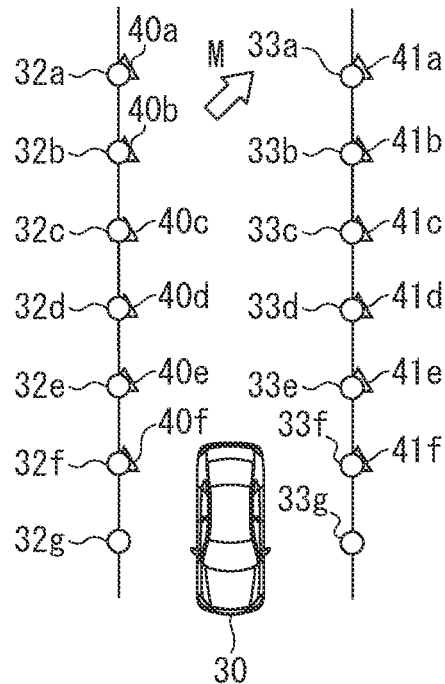
FIG. 4A is an explanatory diagram of a first example of integration processing of map data.

The processing circuit 6 corrects the position coordinates of the boundary points 32a to 32g and the boundary points 33a to 33g in the second boundary point group, which are included in the map data stored in the map storage unit 10, in such a way that the position coordinates of the boundary points 32a to 32g and the boundary points 33a to 33g move by the movement amount M, as illustrated in FIG. 4A.

The processing circuit 6 may correct all the boundary points in the second boundary point group included in the map data or correct only boundary points in the second boundary point group within a predetermined range around the host vehicle.

In addition, for example, the term "to integrate" may include storing, as map data, association information that indicates combinations of boundary points in the first boundary point group and boundary points in the second boundary point group that are combined with each other by the matching and the first boundary point group in the map storage unit or another storage device.

The processing circuit 6 may determine, based on relative positional relationships between boundary points in the first boundary point group and boundary points in the second boundary point group that are combined with each other by the matching and relative positional relationships among the boundary points in the first boundary point group, relative positional relationships between boundary points in the first boundary point group and boundary points in the second boundary point group that were not matched with each other and refer to, as map data, the position coordinates of boundary points in the first boundary point group that were not matched.

Figure 4B:
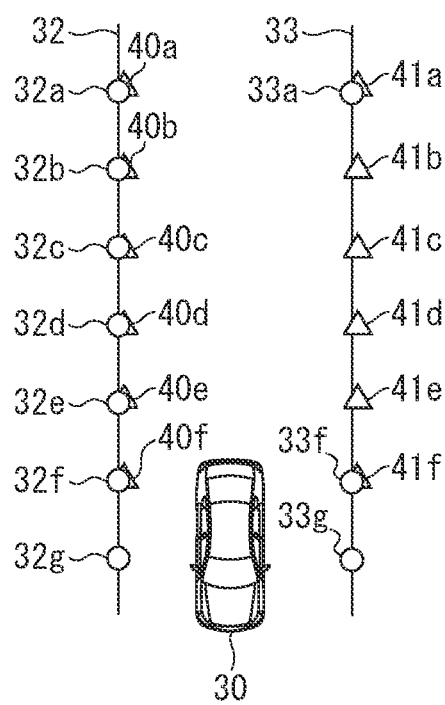
FIG. 4B is an explanatory diagram of a second example of the integration processing of the map data.

For example, FIG. 4B illustrates the boundary points 40a to 40f, 41a, and 41f in the first boundary point group and the boundary points 32a to 32f, 33a, and 33f in the second boundary point group that are combined with each other by the matching, and the boundary points 41b to 41e in the first boundary point group that were not matched.

The processing circuit 6 may determine, based on relative positional relationships between the boundary points 40a to 40f, 41a, and 41f in the first boundary point group and the boundary points 32a to 32f, 33a, and 33f in the second boundary point group and the relative positional relationships among the boundary points in the first boundary point group, position coordinates in the map data of the boundary points 41b to 41e in the first boundary point group.

The processing circuit 6 may recognize, based on the position coordinates of the boundary points 41b to 41e, the position of the lane boundary line 33.

Figure 5A:
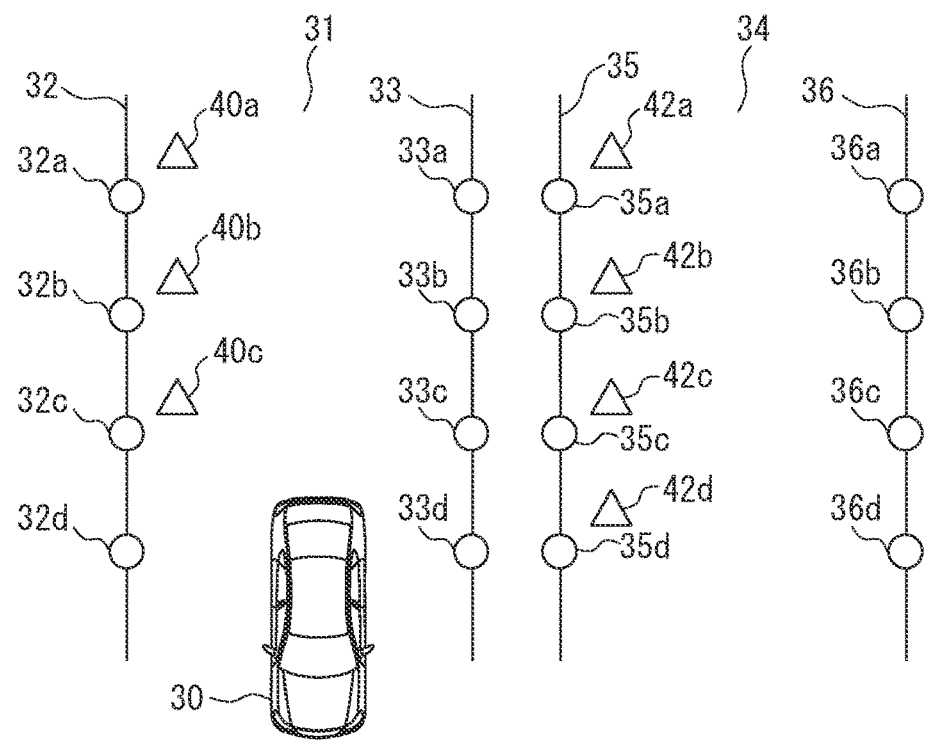
FIG. 5A is an explanatory diagram of an example of map data including boundary points that are close to each other.

FIG. 5A is now referred to. There are some cases where boundary points in the second boundary point group are close to each another.

For example, the lane 31 on which an host vehicle 30 travels and a lane 34 adjacent to the lane 31 are located side by side with a center divider interposed therebetween, and the lane boundary lines 32 and 33 indicate the lane boundaries of the lane 31 and lane boundary lines 35 and 36 indicate the lane boundaries of the lane 34.

The boundary points 32a to 32d in the second boundary point group form the lane boundary line 32, the boundary points 33a to 33d in the second boundary point group form the lane boundary line 33, the boundary points 35a to 35d in the second boundary point group form the lane boundary line 35, and the boundary points 36a to 36d in the second boundary point group form the lane boundary line 36.

Since the lane boundary lines 33 and 35, which indicate lane boundaries of the different lanes 31 and 34, respectively, are close to each other, each of pairs of boundary points 33a and 35a, 33b and 35b, 33c and 35c, and 33d and 35d are close to each other in the vehicle width direction (or in the road width direction).

On the other hand, it is not necessarily possible to detect a lane boundary line in the real world, using the peripheral sensors 5. This is because there are some cases where a white line has faded, where a shielding object exists, where the detection condition is poor, and the like.

In the example in FIG. 5A, the boundary points 40a to 40c forming the lane boundary line 32 and the boundary points 42a to 42d forming the lane boundary line 35 are detected, and the boundary points forming the lane boundary lines 33 and 36 are not detected.

When, in such a case, the boundary points 33a to 33d and the boundary points 35a to 35d are close to each other, respectively, in the vehicle width direction, there is a possibility that the boundary points 42a to 42d in the first boundary point group, which are to be matched with the boundary points 35a to 35d under a normal condition, are mismatched with the boundary points 33a to 33d.

When boundary points are mismatched as described above, the sum E of positional errors cannot be decreased in, for example, the position alignment between boundary points in the first boundary point group and boundary points in the second boundary point group that are combined with each other by the matching, and the precision of the corrected position coordinates of the boundary points in the second boundary point group is reduced.

Thus, the processing circuit 6 excludes boundary points in the second boundary point group that are close to each other from boundary points to be matched. In other words, the processing circuit 6 selects, out of the boundary points in the second boundary point group, a group of boundary points other than boundary points that are close to each other as the boundary points to be matched.

Figure 5B:
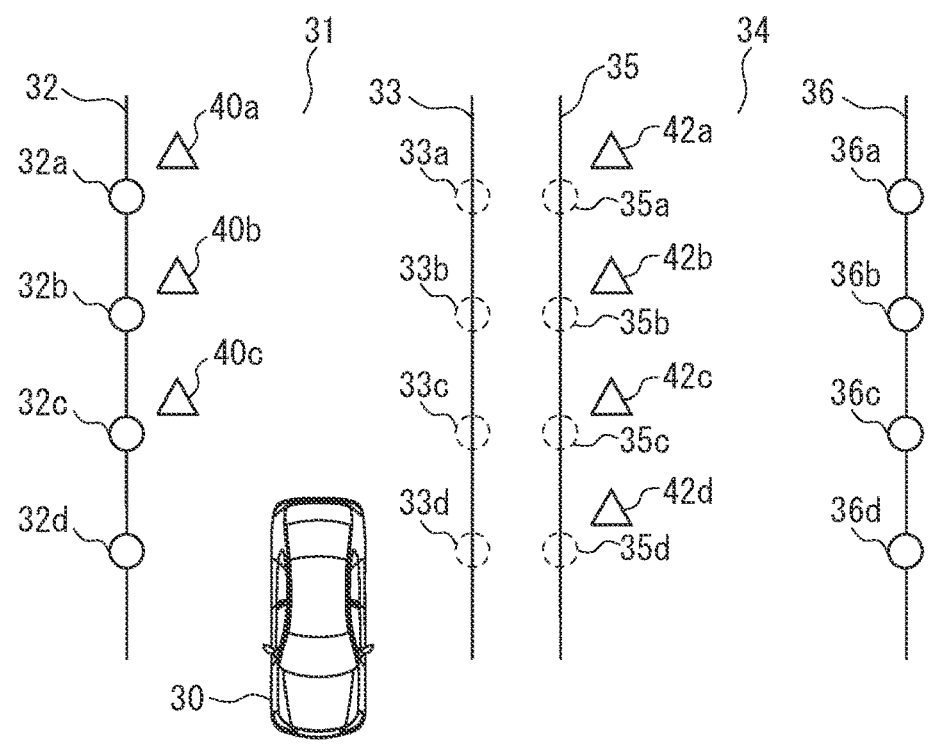
FIG. 5B is an explanatory diagram of a first example of exclusion processing of boundary points to be matched.

For example, as illustrated in FIG. 5B, the processing circuit 6 excludes pairs of boundary points 33a and 35a, 33b and 35b, 33c and 35c, and 33d and 35d, each of which are close to each other, from the boundary points to be matched. In other words, the processing circuit 6 selects boundary points other than the boundary points 33a to 33d and 35a to 35d (for example, the boundary points 32a to 32c) as boundary points to be matched.

On this occasion, the processing circuit 6 may, for example, exclude the boundary points 33a to 33d and 35a to 35d from boundary points to be searched for a boundary point in the second boundary point group to be matched with a boundary point in the first boundary point group. In other words, the processing circuit 6 may select the boundary points 32a to 32d and 36a to 36d, which are boundary points other than the boundary points 33a to 33d and 35a to 35d, as boundary points to be searched.

Hereinafter, excluding boundary points close to each other from the boundary points to be matched and selecting boundary points other than boundary points close to each other as boundary points to be matched are collectively referred to as "to exclude" boundary points from the boundary points to be matched.

The boundary points in the first boundary point group or the boundary points in the second boundary point group are sometimes detected or set densely along the direction of movement of the lane (or the traveling direction of vehicles). Although, in such a case, the boundary points in the first boundary point group or the boundary points in the second boundary point group are close to each other in the movement direction, it is not necessary to exclude boundary points close to each other in the movement direction from the boundary points to be matched.

Therefore, boundary points that are excluded from the boundary points to be matched may be, for example, boundary points close to each other in the vehicle width direction. The boundary points that are excluded from the boundary points to be matched may be boundary points that are close to each other and form different lane boundary lines. The different lane boundary lines may be, for example, the lane boundary lines 33 and 35, which indicate lane boundary lines of the different lanes 31 and 34, as illustrated in FIG. 5B.

When boundary points in the first boundary point group are close to each other, a mismatch may also occur.

Figure 6:
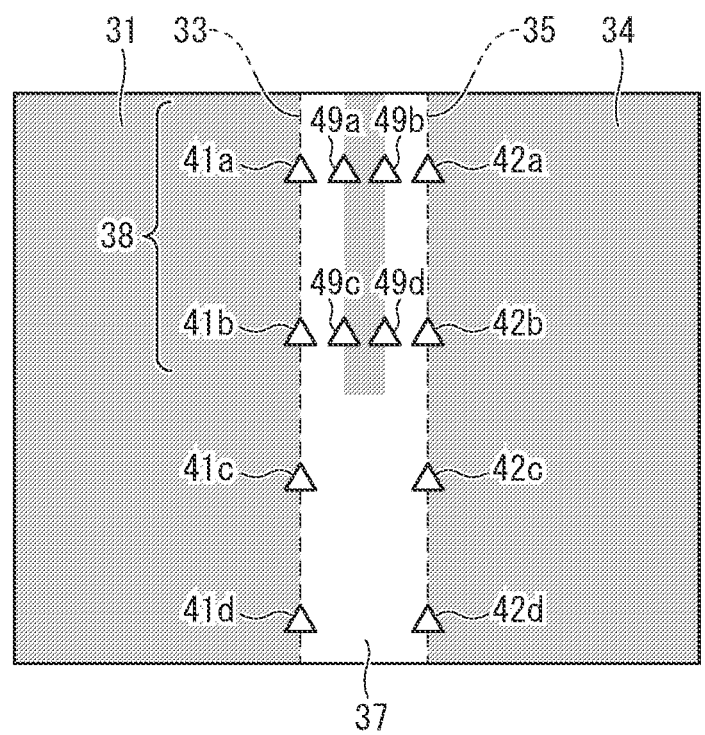
FIG. 6 is an explanatory diagram of a second example of the exclusion processing of boundary points to be matched.

FIG. 6 is now referred to. Since a white line 37 separating the lanes 31 and 34 from each other has faded in a section 38, false boundary points 49a to 49d are erroneously detected in addition to the boundary points 41a to 41d and 42a to 42d of the actual lane boundary lines 33 and 35.

Since the boundary points 49a and 41a, the boundary points 49b and 42a, the boundary points 49c and 41b, and the boundary points 49d and 42b are respectively close to each other, the boundary points may become causes of mismatches. Therefore, the processing circuit 6 may exclude the boundary points 49a and 41a, the boundary points 49b and 42a, the boundary points 49c and 41b, and the boundary points 49d and 42b, each of which are close to each other, from the boundary points to be matched.

FIG. 1 is now referred to. The processing circuit 6 includes logical blocks, such as a lane boundary line recognition unit 21, a matching target selection unit 22, a matching unit 23, a map data integration unit 24, and a travel route calculation unit 25, as functional or physical hardware resources.

The lane boundary line recognition unit 21, the matching target selection unit 22, the matching unit 23, the map data integration unit 24, and the travel route calculation unit 25 may be physical logic circuits, such as PLDs including FPGAs and the like, or functional logic circuits that are equivalently implemented in a general-purpose semiconductor integrated circuit by means of processing by software.

The lane boundary line recognition unit 21, the matching target selection unit 22, the matching unit 23, the map data integration unit 24, and the travel route calculation unit 25 may be achieved by a single piece of hardware or individually achieved by separate pieces of hardware.

For example, the lane boundary line recognition unit 21, the matching target selection unit 22, the matching unit 23, and the map data integration unit 24 may be achieved by a car navigation system, such as an intra-vehicle infotainment (IVI), and the travel route calculation unit 25 and the vehicle control device 8 may be achieved by a driving support system, such as an advanced driving assistance system (ADAS).

The lane boundary line recognition unit 21 recognizes the first boundary point group, based on data of the peripheral environment that the peripheral sensors 5 have detected.

The matching target selection unit 22 selects boundary points to be matched with boundary points in the second boundary point group out of the first boundary point group that the lane boundary line recognition unit 21 has recognized. The matching target selection unit 22 also selects boundary points to be matched with boundary points in the first boundary point group out of the second boundary point group, which is included in the map data stored in the map storage unit 10.

On this occasion, the matching target selection unit 22 excludes boundary points that are close to each other among the boundary points in the first boundary point group from boundary points to be matched with boundary points in the second boundary point group. The matching target selection unit 22 also excludes boundary points that are close to each other among the boundary points in the second boundary point group from boundary points to be matched with boundary points in the first boundary point group. For example, the matching target selection unit 22 excludes boundary points the distance between which is equal to or less than a threshold value Th from the boundary points to be matched. The threshold value Th may be, for example, twice the radius ε (2×ε) of the search circle R1 (see FIG. 3) within which a boundary point is searched for in the matching.

Note that the matching target selection unit 22 does not necessarily have to select boundary points to be matched in both the first boundary point group and the second boundary point group. That is, the matching target selection unit 22 may exclude boundary points that are close to each other only among the boundary points in the first boundary point group from the boundary points to be matched or may exclude boundary points that are close to each other only among the boundary points in the second boundary point group from the boundary points to be matched.

Figure 7:
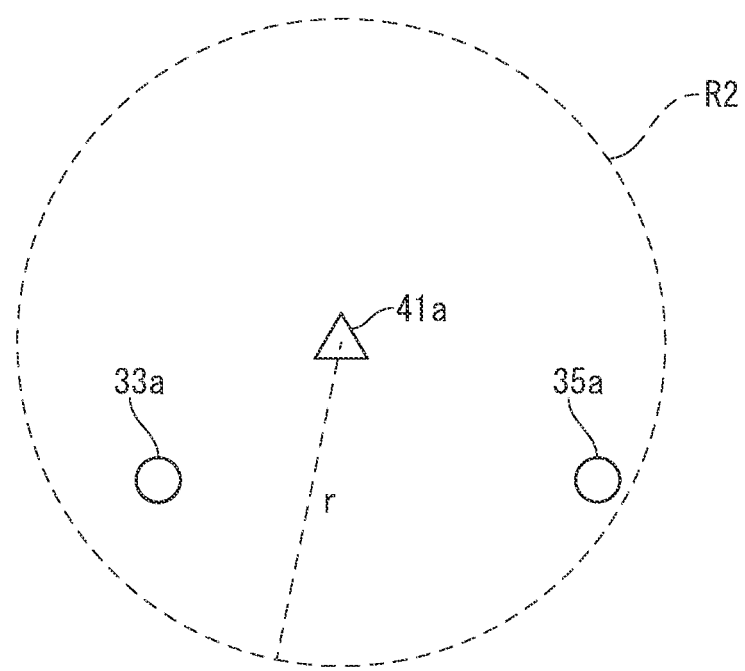
FIG. 7 is an explanatory diagram of a third example of the exclusion processing of a boundary point to be matched.

FIG. 7 is now referred to. There exist a plurality of boundary points 33a and 35a in the second boundary point group that constitute the different lane boundary lines 33 and 35, respectively, in the vicinity of the boundary point 41a, which is a boundary point in the first boundary point group. For example, the boundary points 33a and 35a exist in a range R2 with a radius r around the boundary point 41a. In such a case, it is also difficult to determine which one of the boundary point 33a and 35a the boundary point 41a is to be matched with, and there is a possibility that a mismatch may occur.

Therefore, the matching target selection unit 22 excludes the boundary point 41a in the first boundary point group from the boundary points to be matched when the plurality of boundary points 33a and 35a in the second boundary point group, which form the different lane boundary lines 33 and 35, respectively, exist in a range R2 with a radius equal to or less than a distance threshold value r around the boundary point 41a. The distance threshold value r may be, for example, the radius c of the search circle R1 (see FIG. 3) within which a boundary point is searched for in the matching.

The matching unit 23 matches boundary points in the first boundary point group and boundary points in the second boundary point group that are selected as the boundary points to be matched by the matching target selection unit 22 with each other.

The map data integration unit 24 integrates the first boundary point group and the second boundary point group with each other, based on a result of matching performed by the matching unit 23.

For example, the processing performed by the map data integration unit 24 may include correcting the position coordinates of the boundary points in the second boundary point group in such a way that the positional error between boundary points in the first boundary point group and boundary points in the second boundary point group that are combined with each other by the matching is minimized. In addition, for example, the map data integration unit 24 may store association information indicating combinations of boundary points in the first boundary point group and boundary points in the second boundary point group that are combined with each other by the matching and the first boundary point group in the map storage unit 10 as map data.

The matching target selection unit 22 may determine whether or not the plurality of boundary points 33a and 35a, which form the different lane boundary lines 33 and 35, respectively, in the second boundary point group exist in the range R2 with a radius equal to or less than the distance threshold value r around the boundary point 41a in the first boundary point group, after the position coordinates of the boundary points in the second boundary point group have been corrected by the map data integration unit 24. The matching target selection unit 22 may exclude the boundary point 41a from the boundary points to be matched when such the plurality of boundary points 33a and 35a exist in the range R2 with a radius equal to or less than the distance threshold value r around the boundary point 41a.

Using the second boundary point group the positions of which are corrected in this manner enables the position coordinates of the boundary points in the first boundary point group and the position coordinates of the boundary points in the second boundary point group to be compared with each other with higher accuracy. As a result, it is possible to determine boundary points in the first boundary point group that may become causes of mismatches with higher accuracy.

The travel route calculation unit 25 generates a travel route along which the host vehicle is made to travel, based on the map data in which the first boundary point group and the second boundary point group are integrated. The travel route calculation unit 25 outputs the generated travel route to the vehicle control device 8.

(Operation)

Figure 8:
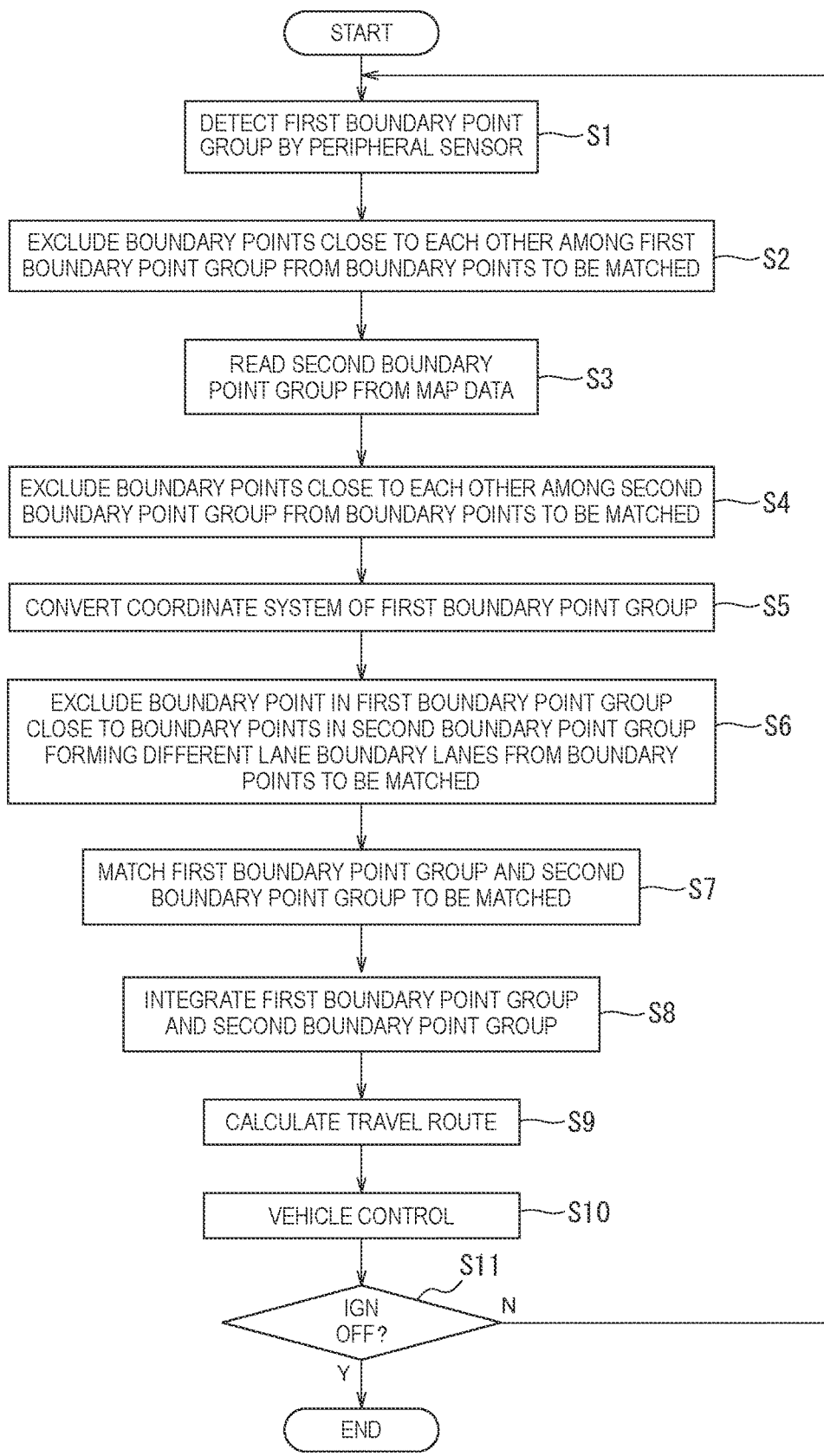
FIG. 8 is a flowchart of an example of a driving support method of the embodiment.

Next, operation of the driving support device 1 of the embodiment will be described. FIG. 8 is now referred to.

In step S1, the lane boundary line recognition unit 21 detects a first boundary point group, based on data of a peripheral environment that the peripheral sensors 5 have detected.

In step S2, the matching target selection unit 22 excludes boundary points that are close to each other among the boundary points in the first boundary point group from boundary points to be matched with boundary points in a second boundary point group.

In step S3, the matching target selection unit 22 reads the second boundary point group from map data stored in the map storage unit 10.

In step S4, the matching target selection unit 22 excludes boundary points that are close to each other among the boundary points in the second boundary point group from boundary points to be matched with boundary points in the first boundary point group.

In step S5, the matching target selection unit 22 converts the coordinate system of the first boundary point group to the same coordinate system as that of the map data.

In step S6, the matching target selection unit 22 determines whether or not a single boundary point in the first boundary point group is close to a plurality of boundary points in the second boundary point group that form different lane boundary lines.

For example, the matching target selection unit 22 determines whether or not a plurality of boundary points in the second boundary point group that form different lane boundary lines exist in a range with a radius equal to or less than a distance threshold value around the boundary point in the first boundary point group. When such a plurality of boundary points in the second boundary point group exist, the matching target selection unit 22 excludes the boundary point in the first boundary point group from the boundary points to be matched.

In step S7, the matching unit 23 matches boundary points in the first boundary point group and boundary points in the second boundary point group that are selected as boundary points to be matched.

In step S8, the map data integration unit 24 integrates the first boundary point group and the second boundary point group with each other, based on a result of the matching performed by the matching unit 23. The map data integration unit 24 stores map data in which the first boundary point group and the second boundary point group are integrated in the map storage unit 10.

In step S9, the travel route calculation unit 25 generates a travel route along which the host vehicle is made to travel, based on the map data in which the first boundary point group and the second boundary point group are integrated.

In step S10, the vehicle control device 8 performs vehicle control of the host vehicle by driving the actuators 9 in such a way that the host vehicle travels along the travel route generated by the travel route calculation unit 25.

In step S11, the processing circuit 6 determines whether or not an ignition switch (IGN) of the host vehicle has been turned off. When the ignition switch has been turned off (step S11: Y), the processing is terminated. When the ignition switch has not been turned off (step S11: N), the processing returns to step S1.

Advantageous Effects of Embodiment (1) The lane boundary line recognition unit 21 detects a first boundary point group that includes boundary points forming lane boundary lines, using the peripheral sensors 5 mounted on the host vehicle. The matching target selection unit 22 converts the coordinate system of the first boundary point group to the same coordinate system as that of map data. The matching target selection unit 22 and the matching unit 23 perform matching between a first point group constituted by boundary points that are not close to each other in either one of the second boundary point group, which includes boundary points forming lane boundary lines in the map data, and the first boundary point group and the other of the first boundary point group and the second boundary point group.

This configuration enables data of boundary points that are likely to cause mismatches between the first boundary point group detected by the peripheral sensors 5 and the second boundary point group in the map data to occur to be excluded from the boundary points to be matched. This capability enables mismatches between the first boundary point group and the second boundary point group to be reduced.

This capability enables the sum E of positional errors to be decreased in, for example, position alignment between the first boundary point group and the second boundary point group that are combined with each other by the matching and the precision of the position coordinates of the boundary points in the map data to be thereby improved.

(2) The matching target selection unit 22 and the matching unit 23 perform matching between a first point group constituted by boundary points that are not close to each other in either one of the first boundary point group and the second boundary point group and a second point group constituted by boundary points that are not close to each other in the other of the first boundary point group and the second boundary point group.

That is, the matching target selection unit 22 and the matching unit 23 perform matching between a point group constituted by boundary points that are not close to each other in the first boundary point group and a point group constituted by boundary points that are not close to each other in the second boundary point group.

Excluding boundary points that are close to each other from the boundary points to be matched in both the first boundary point group and the second boundary point group enables probability of mismatches between the first boundary point group and the second boundary point group to be further reduced.

(3) The matching target selection unit 22 determines whether or not boundary points are close to each other depending on whether or not the distance between the boundary points is equal to or less than a threshold value Th.

Determining whether or not boundary points are close to each other by comparison between the distance between boundary points and the threshold value Th in this manner enables boundary points that are close to each other to be determined easily and accurately.

(4) The threshold value Th may be equal to twice the radius $\varepsilon$ ($2\times\varepsilon$) of a search circle R1 within which a boundary point is searched for in matching performed by the matching unit 23.

Setting the threshold value Th used for determination of whether or not boundary points are close to each other to be twice the radius $\varepsilon$ ($2\times\varepsilon$) of the search circle R1 in the matching in this manner enables data that may cause mismatches to occur to be surely excluded from the boundary points to be matched.

(5) When a plurality of boundary points 33a and 35a in the second boundary point group exist in a range R2 with a radius equal to or less than a distance threshold value r around a boundary point 41a in the first boundary point group, the matching target selection unit 22 excludes the boundary point 41a included in the first boundary point group from the boundary points to be matched. For example, when the plurality of boundary points 33a and 35a in the second boundary point group that form the different lane boundary lines exist in the range R2 with a radius equal to or less than the distance threshold value r around the single boundary point 41a in the first boundary point group, the matching target selection unit 22 excludes the boundary point 41a included in the first boundary point group from the boundary points to be matched.

This configuration enables boundary points in the first boundary point group that are likely to be mismatched to be excluded from the boundary points to be matched.

(6) The distance threshold value r may be equal to the radius c of the search circle R1 within which a boundary point is searched for in the matching. This configuration enables boundary points in the first boundary point group that are likely to cause mismatches to occur to be surely excluded from the boundary points to be matched.

(7) When the plurality of boundary points 33a and 35a in the second boundary point group that form the different lane boundary lines 33 and 35, respectively, exist in the range R2 with a radius equal to or less than the distance threshold value r around the boundary point 41a in the first boundary point group after the position coordinates of the second boundary point group have been corrected by the map data integration unit 24, the matching target selection unit 22 may exclude the boundary point 41a in the first boundary point group from the boundary points to be matched.

Using the second boundary point group the positions of which are corrected in this manner enables the position coordinates of the boundary points in the first boundary point group and the position coordinates of the boundary points in the second boundary point group to be compared with each other with higher accuracy. As a result, it is possible to determine boundary points in the first boundary point group that may become causes of mismatches with higher accuracy.

(Variations)

(1) The matching target selection unit 22 may increase the density of the second boundary point group by interpolating boundary points in the second boundary point group in the map data and thereby generating new boundary points and adding the generated boundary points to the second boundary point group.

Further, when the plurality of boundary points 33a and 35a in the second boundary point group that form the different lane boundary lines 33 and 35, respectively, exist in the range R2 with a radius equal to or less than the distance threshold value r around the boundary point 41a in the first boundary point group after boundary points have been added to the second boundary point group by means of interpolation, the matching target selection unit 22 may exclude the boundary point 41a in the first boundary point group from the boundary points to be matched.

Adding new boundary points to the second boundary point group in this manner enables matching between the first boundary point group and the second boundary point group to be performed with higher accuracy.

(2) The threshold value Th and the distance threshold value r, which are used in the determination of whether or not boundary points are close to each other, may be dynamically changed.

For example, the threshold value Th and the distance threshold value r may be dynamically changed according to positional errors ei in the previous round of position alignment between the first boundary point group and the second boundary point group.

For example, a maximum value of the positional errors when the sum $E=\Sigma_{i=1}^{12}$ ei of the positional errors is minimized in position alignment between the first boundary point group and the second boundary point group is denoted by emax=$\max_i$(ei). In this case, it is predicted that the boundary points in the first boundary point group and the boundary points in the second boundary point group have positional errors of at most approximately emax therebetween.

Therefore, when the distance between boundary points is equal to or less than 2×emax, there is a possibility that a mismatch occurs. Thus, the threshold value Th may be set at 2×emax.

In addition, the threshold value Th and the distance threshold value r may be set according to the average, the median, the minimum of the positional errors ei when the sum E of the positional errors is minimized, or the threshold value Th and the distance threshold value r may be set according to the sum E of the positional errors.

(3) It is preferable not to decrease the number of boundary points in the first boundary point group and boundary points in the second boundary point group to be matched with each other when the number of detected boundary points in the first boundary point group is small. Therefore, the threshold value Th and the distance threshold value r may be dynamically changed according to the number of detected boundary points in the first boundary point group.

For example, as vehicle speed increases, the number of detected boundary points in the first boundary point group decreases. Therefore, the threshold value Th and the distance threshold value r may be dynamically changed according to the vehicle speed. For example, as the vehicle speed increases, a smaller threshold value Th and a smaller distance threshold value r may be set.

When the first boundary point group is detected using a camera, the threshold value Th and the distance threshold value r may be dynamically changed according to image-capturing conditions. The threshold value Th and the distance threshold value r may be dynamically changed according to weather conditions, image-capturing date and time, a vehicle exterior environment, and illumination around the vehicle.

(4) Because of a similar reason, the matching target selection unit 22 may select boundary points that are close to each other as boundary points to be matched depending on the number of detected boundary points in the first boundary point group, vehicle speed, image-capturing conditions, weather conditions, image-capturing date and time, vehicle exterior environment, and illumination around the vehicle.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Driving support device
2 Storage device
3 Global positioning system receiver
4 Vehicle sensor
5 Peripheral sensor
6 Processing circuit
7 Display
8 Vehicle control device
9 Actuator
10 Map storage unit
21 Lane boundary line recognition unit
22 Matching target selection unit
23 Matching unit
24 Map data integration unit
25 Travel route calculation unit

The invention claimed is:

1. A driving support method comprising:
   detecting, using a sensor mounted in or on a vehicle, a first boundary point group including boundary points forming a lane boundary line;
   converting a coordinate system of the first boundary point group to the same coordinate system as a coordinate system of map data;
   reading, from the map data, a second boundary point group including boundary points forming a lane boundary line in the map data;
   at least one of:
      determining whether or not first and second boundary points in the first boundary point group are close to each other in a vehicle width direction, depending on whether a distance between the first and second boundary points is equal to or less than a threshold, and excluding, from boundary points to be matched, the first and second boundary points that are determined to be close to each other; or
      determining whether or not third and fourth boundary points in the second boundary point group are close to each other in the vehicle width direction, depending on whether a distance between the third and fourth boundary points is equal to or less than the threshold, and excluding, from the boundary points to be matched, the third and fourth boundary points that are determined to be close to each other; and
   performing matching between boundary points in the first boundary point group that are not excluded from the boundary points to be matched and boundary points in the second boundary point group that are not excluded from the boundary points to be matched.

2. The driving support method according to claim 1, wherein the threshold is equal to twice a radius of a search circle within which a boundary point is searched for in the matching.

3. The driving support method according to claim 1, wherein when a plurality of boundary points in the second boundary point group exist in a range with a radius equal to or less than a distance threshold value around a boundary point in the first boundary point group, the boundary point included in the first boundary point group is excluded from the boundary points to be matched.

4. The driving support method according to claim 3, wherein the distance threshold value is equal to a radius of a search circle within which a boundary point is searched for in the matching.

5. The driving support method according to claim 3, wherein the second boundary point group is a boundary point group in the map data, the boundary point group being corrected using a result of the matching.

6. The driving support method according to claim 1 further comprising:
generating a boundary point by interpolating the boundary points in the map data; and
adding the generated boundary point to the second boundary point group.

7. A driving support device comprising:
a sensor mounted in or on a vehicle and configured to detect a first boundary point group including boundary points forming a lane boundary line;
a storage device configured to store map data; and
a controller configured to:
convert a coordinate system of the first boundary point group to the same coordinate system as a coordinate system of the map data;
read, from the map data, a second boundary point group that includes boundary points forming a lane boundary in the map data;
at least one of:
determine whether or not first and second boundary points in the first boundary point group are close to each other in a vehicle width direction, depending on whether a distance between the first and second boundary points is equal to or less than a threshold, and exclude, from boundary points to be matched, the first and second boundary points that are determined to be close to each other; or
determining whether or not third and fourth boundary points in the second boundary point group are close to each other in the vehicle width direction, depending on whether a distance between the third and fourth boundary points is equal to or less than the threshold, and exclude, from the boundary points to be matched, the third and fourth boundary points that are determined to be close to each other; and
perform matching between boundary points in the first boundary point group that are not excluded from the boundary points to be matched and boundary points in the second boundary point group that are not excluded from the boundary points to be matched.

8. A driving support method comprising:
detecting, using a sensor mounted on or in a vehicle, a first boundary point group including boundary points forming a lane boundary line;
converting a coordinate system of the first boundary point group to the same coordinate system as a coordinate system of map data; and
performing matching between a first point group constituted by boundary points not close to each other in either one of a second boundary point group including boundary points forming a lane boundary line in the map data and the first boundary point group and the other of the first boundary point group and the second boundary point group;
wherein at least one of:
whether or not the boundary points are close to each other is determined depending on whether or not distance between the boundary points is equal to or less than a threshold value equal to twice a radius of a search circle within which a boundary point is searched for in the matching; or
when a plurality of boundary points in the second boundary point group exist in a range with a radius equal to or less than a distance threshold value around a boundary point in the first boundary point group, the boundary point included in the first boundary point group is excluded from boundary points to be matched in the matching.

9. The driving support method according to claim 8, wherein the distance threshold value is equal to a radius of a search circle within which a boundary point is searched for in the matching.

10. The driving support method according to claim 8, wherein the second boundary point group is a boundary point group in the map data, the boundary point group being corrected using a result of the matching.

* * * * *